UNITED STATES PATENT OFFICE.

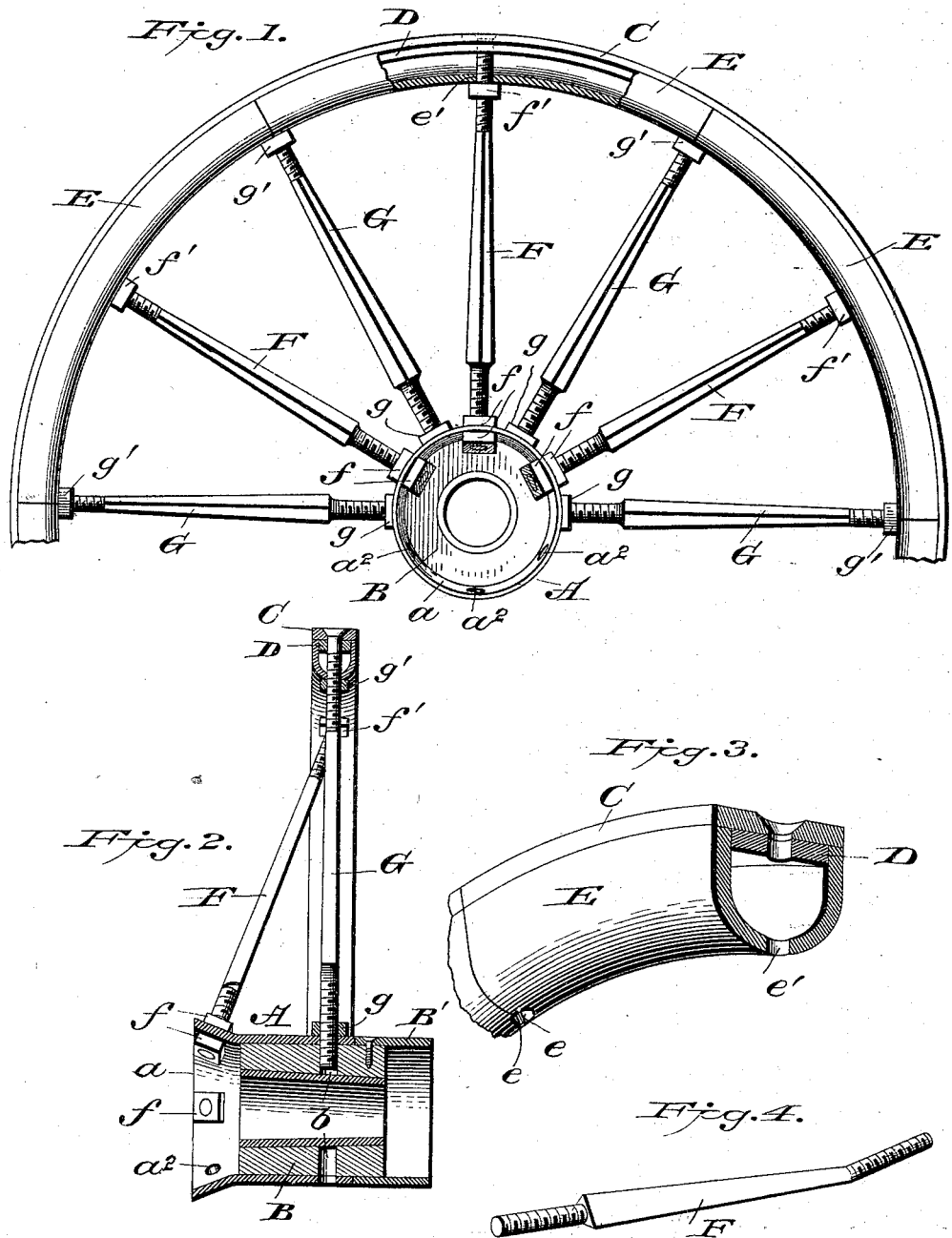

THEOPHILE PINARD, OF CLACKAMAS COUNTY, OREGON.

VEHICLE-WHEEL.

SPECIFICATION forming part of Letters Patent No. 625,200, dated May 16, 1899.

Application filed February 7, 1899. Serial No. 704,770. (No model.)

*To all whom it may concern:*

Be it known that I, THEOPHILE PINARD, a citizen of the United States of America, residing in the county of Clackamas, in the State of Oregon, have invented certain new and useful Improvements in Vehicle-Wheels; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in wheels for vehicles; and the object is to provide a metal wheel of such construction that the spokes will serve to hold the fellies and tire in engagement with a hub-band, so that the dish of the wheel may be changed by adjusting-nuts which are mounted on the spokes, said nuts engaging with the fellies and also with the hub-band, the construction also providing means whereby the ends of the spokes will hold a wooden hub in positive engagement with the hub-band.

A further object of the invention is to generally improve the construction of this type of wheel, so that in use the objections to a wooden wheel will be obviated.

In the accompanying drawings, Figure 1 is a side elevation of a portion of a wheel constructed in accordance with my invention. Fig. 2 is a vertical section. Fig. 3 is a perspective view of a part of one of the felly-sections, and Fig. 4 is a perspective view of one of the spokes.

In the manufacture of a wheel constructed in accord with my invention I use a metallic hub-band A, the inner edge $a$ of which is flared at an obtuse angle with its body portion, and this flared part $a$ has therethrough apertures $a^2$.

The hub B consists of a cylindrical block of wood which is bored to receive the axle-box and has circumferentially a series of apertures $b$, which are adapted to receive the ends of one set of spokes, which spokes serve to hold the wooden hub securely in the hub-band.

To the outer end of the hub I attach a hub-band B', which may be of any suitable type, and, if desirable, this outer hub-band may be a continuation of the band A.

The rim of the wheel is made up of a tire C, an inner band or ring D, and a series of felly-sections E, the ends of each felly-section having therein semicircular recesses $e$ and intermediate apertures $e'$. When the felly-sections are placed so that their ends abut, the recesses $e$ will form apertures which correspond as to size with the apertures $e'$. The ring D is of sufficient width to fit closely between the side members of the fellies, and said ring and the tire C have openings or apertures which register with the openings in the felly. The tire is countersunk where the apertures are formed therethrough.

The spokes are preferably made of steel, the ends being screw-threaded and of such a diameter that they may be readily passed through the apertures in the hub-band A and through the apertures in the felly, ring, and tire. The inner series of spokes F carry nuts $f$, which are adapted to engage with the opposite sides of the flared end $a$ of the hub-band. The opposite ends of the spokes F carry nuts $f'$ for engagement with the inner portion of the fellies. The spokes G, which project substantially at right angles from the hub, have on the ends adjacent to the hub-band nuts $g$ and on their opposite ends nuts $g'$. It will be noted that the threaded portions of the spokes adjacent to the rim are of such a length that the nuts may be moved thereon for a considerable distance, which permits the ends to be passed through the rim sufficiently to permit the opposite ends to be placed in position. Between the threaded portions the spokes are shaped so as to be triangular in cross-section, and they taper from the threaded portion adjacent to the hub outward, and when the wheel has been set up the ends of the spokes, which pass through the tire, are upset, so that the ends will lie within the countersunk recesses.

A wheel constructed as herein shown can be readily put together, and when put together the parts may be tightened so as to prevent rattling and to take up wear.

It will be observed that the outer set of spokes pass between the felly-sections and hold them from turning, the nuts on the ends of said spokes forming a support for the fellies, which provides an extremely strong wheel.

Having thus described my invention, what I claim as new, and desire to secure by Letters Patent, is—

1. A wheel comprising a tire, a band which engages therewith, a felly made up of a series of sections which overlie the band and engage with the tire, metallic spokes having threaded portions and nuts which engage with the fellies, a hub-band inclosing a hub having apertures through which the inner ends of the spokes pass and nuts for holding the same in engagement with the band, substantially as shown.

2. In combination with a wooden hub having a series of apertures, of a hub-band which incloses said wooden hub, the same having openings therethrough opposite the apertures in the hub and a flared end with apertures out of line therewith; together with the spokes and other component parts of a wheel, said spokes passing through the band into the hub and through the portion of the hub-band beyond the wooden hub, substantially as shown.

In testimony whereof I affix my signature in presence of two witnesses.

THEOPHILE PINARD.

Witnesses:
 C. T. TOOZE,
 C. R. SHORT.